United States Patent [19]

Lordo

[11] Patent Number: 4,529,902
[45] Date of Patent: Jul. 16, 1985

[54] FRAME MODULE FOR FORMING TUBULAR FRAME OF PERMANENT MAGNET DIRECT CURRENT MOTOR

[75] Inventor: Robert E. Lordo, Fort Mill, S.C.

[73] Assignee: Powertron Division of Contraves Goerz Corp., Charlotte, N.C.

[21] Appl. No.: 413,867

[22] Filed: Sep. 1, 1982

[51] Int. Cl.³ .............................................. H02K 7/20
[52] U.S. Cl. ..................................... 310/112; 310/89; 310/154
[58] Field of Search ................. 310/112, 154, 46, 268, 310/89

[56] References Cited

U.S. PATENT DOCUMENTS 2,006,172 6/1935 Klappauf ........................ 310/112 X
2,864,964 12/1958 Kober ................................ 310/112
4,211,945 7/1980 Tawse ................................ 310/112
4,233,532 11/1980 Esters ............................. 310/112 X
4,358,693 11/1982 Palmer et al. ................... 310/112 X Primary Examiner—Donovan F. Duggan
Attorney, Agent, or Firm—W. Thad Adams, III

[57] ABSTRACT

A frame (14) for a permanent magnet direct current motor (10) is formed of a plurality of frame modules (15). Each frame module (15) is of equal axial length and cross-sectional dimensions for being matingly connected together end-to-end to form the tubular frame (14) to a desired length.

8 Claims, 5 Drawing Figures

FRAME MODULE FOR FORMING TUBULAR FRAME OF PERMANENT MAGNET DIRECT CURRENT MOTOR

TECHNICAL FIELD AND BACKGROUND OF THE INVENTION

This invention relates to the construction of a tubular frame for a permanent magnet direct current motor. The tubular frame is constructed of a plurality of frame modules of equal axial length and cross-sectional dimensions. The modules are connected together end-to-end to form the tubular frame to accommodate a suitably sized rotatably mounted armature. The general disclosure of this invention relates equally to motors and generators. For purposes of illustration the specific disclosure of this application is directed to permanent magnet, direct current motors.

Direct current motors are manufactured in a wide variety of diameters and lengths. Many different sizes are necessary because of space requirements which dictate overall motor dimensions, and power requirements, which are generally proportional to armature length and diameter.

Heretofore, this has meant the fabrication of each motor configuration in a wide variety of cross-sectional dimensions as well as a variety of lengths, such as 4", 8", 12", etc. The resulting number of different motor frame components and magnets necessary for the manufacture of all of these various sizes of motors, results in increased manufacturing costs and inventory expense.

According to the invention disclosed and described in this application, manufacturing and inventory expenses can be reduced substantially by forming motor frames of different lengths from a plurality of uniformly sized components for any given motor diameter.

SUMMARY OF THE INVENTION

Therefore, it is an object of the invention to provide a tubular frame of a pre-determined length for a permanent magnet direct current motor.

It is another object of the present invention to provide a permanent magnet direct current motor having a tubular frame constructed of a plurality of frame modules of equal axial length and cross-sectional dimensions.

It is yet another object of the present invention to provide a frame module for constructing a tubular frame for a permanent magnet direct current motor, wherein the permanent magnets mounted within the frame module are of a uniform size.

These and other objects and advantages of the present invention are achieved in the preferred embodiment below by providing a tubular frame for a permanent magnet direct current motor. Each frame comprises a plurality of frame modules of equal axial length and cross-sectional dimensions. The frame modules are matingly connected together end-to-end, the inner walls of each of the frame modules defining a longitudinally extending through bore within which an armature is mounted. Depending upon the number of frame modules connected together, a machine frame having any one of several desired lengths can be constructed of identical frame modules.

According to one preferred embodiment of the invention the inner walls of each of the frame modules define a through bore which is substantially square in cross-section. A plurality of arcuate, recessed seats are formed to the inner walls of the frame module in spaced-apart intervals around and extending along at least a part of the length of the frame module. The walls of the frame module along the extent of the seats are of reduced cross-sectional thickness. An arcuate permanent magnet having a convex and a concave side is matingly adhered by its convex side against each of the seats, with the opposite concave side facing into the through bore in closely spaced-apart relation to a suitably sized armature. The frame module according to this preferred embodiment accommodates a relatively larger sized armature.

According to another preferred embodiment of the present invention, each frame module defines a through bore which is substantially cylindrical in cross-section.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
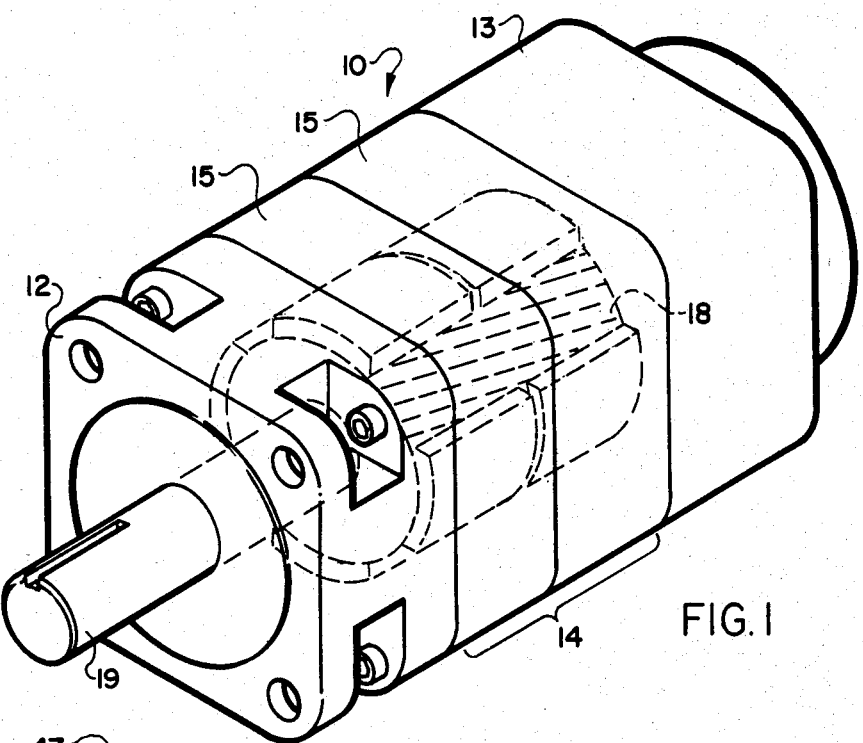
FIG. 1 is a square cross-section permanent magnet direct current motor according to one embodiment of the present invention.

Referring now specifically to the drawings, a preferred embodiment of a permanent magnet direct current motor according to the present invention is shown in FIG. 1 and designated generally by broad reference numeral 10. Motor 10 comprises an end cap 12 on one end and an accessory housing 13 on the other end. Centrally disposed between end cap 12 and accessory housing 13 is a tubular frame 14 comprising two frame modules 15 according to the present invention. An armature 18 is mounted on a shaft 19 for rotation within motor 10.

Each frame module 15 is identical. While a motor having two frame modules 15 is shown in FIG. 2, a motor of any desired length can be constructed by using an appropriate number of modules 15.

Figure 3:
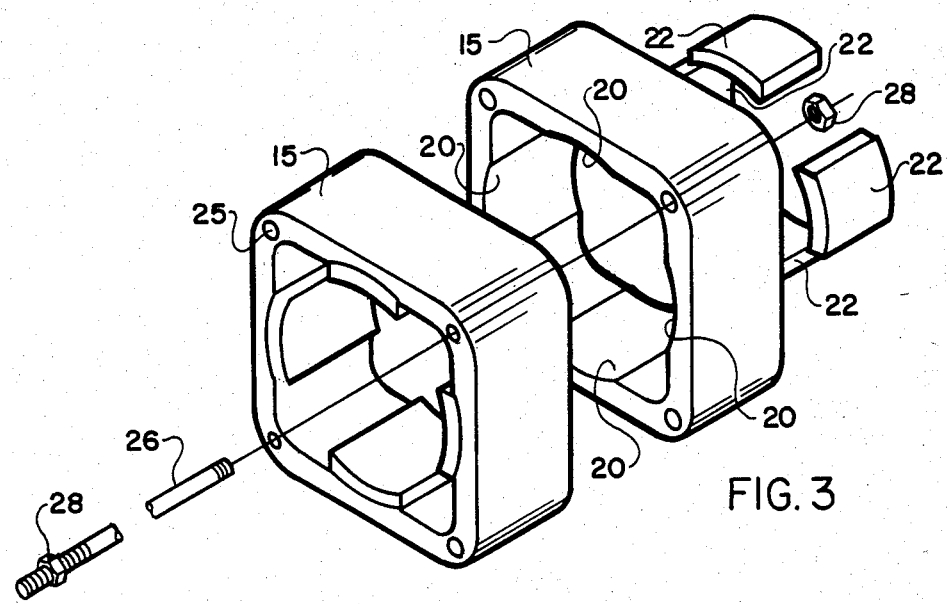
FIG. 3 is a perspective view of two motor frame modules according to the present invention.
Figure 4:
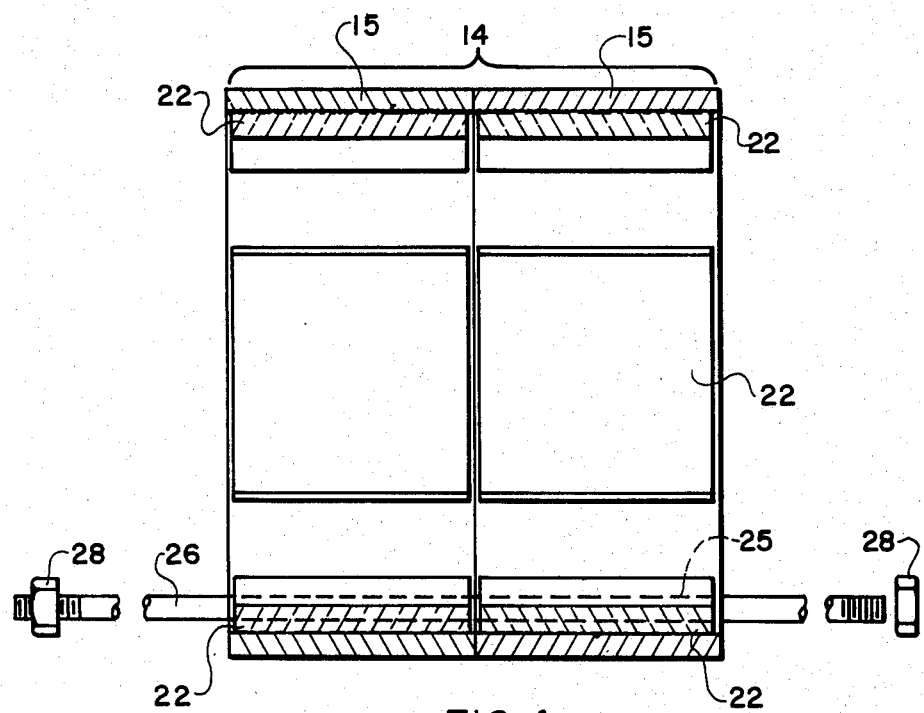
FIG. 4 is a cross-sectional view of two motor frame modules of the type shown in FIG. 3, bolted together; and, FIG. 5 is a cross-sectional view of one of the modules shown in FIG. 2.

The particular type of module 15 illustrated in FIGS. 1 and 3 is substantially square in cross-section. A recessed seat 20 is formed into each of the four inner walls of the frame module 15 resulting in the walls along the extent of the seats 20 being of reduced cross-sectional thickness. A permanent magnet 22 is matingly adhered to each of the seats 20. Therefore, each of the modules 15 and attached sets of magnets 22 defines an individual stator assembly. The modules 15 may be connected together in any suitable fashion. In the embodiment shown in FIGS. 1 and 3 a bolt hole 25 is provided through the walls of each module 15. The modules 15 as well as the end cap 12 and the accessory housing 13 are matingly aligned and a bolt 26 is threaded to receive a matingly threaded nut 28. As is best shown in FIG. 4, each of the magnets is slightly shorter than the overall length of each of the modules 15. The magnets 22 are centered within each seat 20 so that a very slight space is left between the magnet 22 and each edge of module 15. Therefore, the magnets 22 do not interfere with the proper alignment of the modules 15 together to form the frame 14. The slight space left between magnets 22 and adjacent modules 15 is so small that the power of the motor and the magnet flux linkages is not affected.

Figure 5:
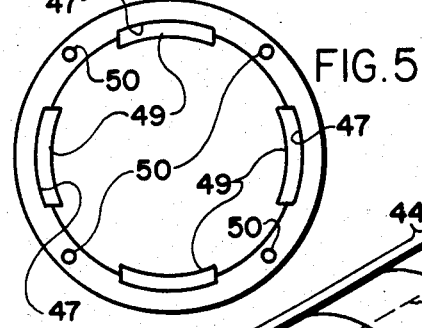
Figure 2:
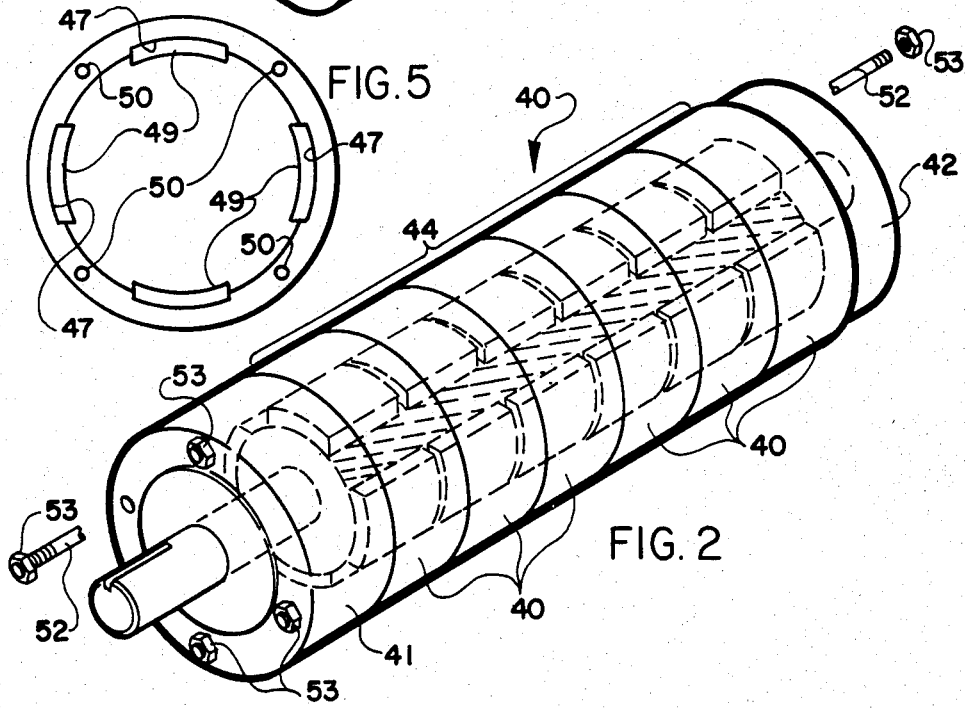
FIG. 2 is a circular cross-section permanent magnet direct current motor according to another embodiment of the present invention.

FIG. 2 shows an alternative embodiment of the invention, illustrating that any number of modules can be connected together to form a suitably sized motor frame and that the modules themselves may take different shapes. In FIG. 2, a motor is shown and designated generally by broad reference numeral 40. Motor 40 comprises an end cap 41 on one end and accessory housing 42 on the other end. A tubular motor frame 44 is centrally disposed between the end cap 41 and accessory housing 42 and comprises 6 frame modules 46 according to the present invention. As is shown in FIG. 5, each frame module 46 is circular in cross-section. In the particular embodiment shown in FIGS. 2 and 5, recessed seats 47 are formed into the inner walls of each module 36 and are adapted to be fitted with an arcuate permanent magnet 49. Preferably, each magnet 49 has a convex side for being adhered against one of the seats 47 and a concave side for facing into a centrally disposed bore defined by the inner walls of module 46. As with the square modules 15, magnets 49 are slightly shorter than the length of each module 46 so that a narrow space is present between magnets 49 of adjacent modules 46.

While modules 46 may be secured together by any number of suitable means, they are preferably connected by means of matingly aligned holes 50 (FIG. 5) through which a suitably sized threaded bolt is passed. Each bolt 52 is threaded on each end to receive a matingly threaded nut 53.

Constructing motor frames of the modules disclosed above substantially reduces manufacturing expenses, since numerous different lengths of motors can be constructed from a single sized module.

Manufacturing time is also reduced since the correct size of module for any given diameter motor will always be in stock. Permanent magnet inventories are also simplified since each module in a given diameter will use the same magnets without regard to the ultimate length of the motor.

A tubular frame for a permanent magnet direct current motor is described above. Various details of the invention may be changed without departing from its scope. Furthermore, the foregoing description of a preferred embodiment of the motor according to the present invention is provided for the purpose of illustration only and not for the purpose of limitation—the invention being defined by the claims.

I claim:

1. A permanent magnet direct current machine comprising a tubular frame, said frame comprising a plurality of frame modules of equal axial length and cross-section dimensions for being matingly connected together end-to-end to form the tubular frame to a desired length, the inner walls of each of said frame modules defining a longitudinally extending through bore for accommodating the diameter of an armature, a single wound armature positioned for rotation in the bore and extending the entire length of said tubular frame to form a single, unitary machine with each frame module in unison phase with every other module of the tubular frame, and means for connecting said frame modules together bore-to-bore whereby machine frames having one of several desired lengths can be constructed of identical frame modules.

2. A permanent magnet direct current machine according to claim 1, wherein the inner walls of each of said frame modules defines a through bore which is substantially square in cross-section.

3. A permanent magnet direct current machine according to claim 1, wherein the inner walls of each of said frame modules defines a through bore which is substantially circular in cross-section.

4. A permanent magnet direct current machine according to claim 1 wherein each of said tubular frame modules includes:
    (a) a plurality of arcuate, recessed seats formed into inner walls of the frame module in spaced-apart intervals around and extending along at least a part of the length of the frame module, the walls of the frame module along the extent of said seats being of reduced cross-sectional thickness; and,
    (b) a plurality of arcuate permanent magnets, each magnet having a convex side for being matingly adhered against one of said plurality of seats, and an opposite concave side for facing into said through bore in closely spaced-apart relation to a suitably sized armature.

5. A permanent magnet direct current machine according to claim 1, wherein said means for connecting said frame modules together comprises walls defining a plurality of axially extending through holes in each frame module for being matingly aligned; a bolt for being positioned in said matingly aligned through holes, said bolt having a threaded end for receiving a matingly threaded nut.

6. A permanent magnet direct current machine, comprising:
    (a) a plurality of frame modules of equal axial length and cross-sectional dimensions matingly connected together end-to-end to form a tubular frame of a desired length, the inner walls of said tubular frame defining a longitudinally extending through bore;
    (b) a single, wound armature positioned for rotation in the bore and length of said tubular frame to form a single, unitary machine with each frame module in unison phase with every other module of the tubular frame;
    (c) a plurality of arcuate, recessed seats formed into the inner walls of each frame module in spaced-apart intervals around and extending along at least a part of the length of the frame module, the walls of said frame module along the extent of said seats being of reduced cross-sectional thickness;
    (d) a plurality of arcuate permanent magnets, each magnet having a convex side for being matingly adhered against one of said plurality of said seats and an opposite concave side for facing into said through bore in closely spaced-apart relation to said armature; and,
    (e) means cooperating with said tubular frame for enclosing said armature and said magnets within said through bore.

7. A permanent magnet direct current machine according to claim 6 wherein said magnets are adhered against said seats by means of an adhesive.

8. A permanent magnet direct current machine according to claim 6 wherein said machine includes only a single power terminal, set of brushes and commutator.

* * * * *